(12) United States Patent
Gillum et al.

(10) Patent No.: US 11,145,180 B2
(45) Date of Patent: Oct. 12, 2021

(54) BEACON DETECTION SYSTEM FOR LOCATING MISSING PERSONS

(71) Applicant: Vector Flight LLC, San Francisco, CA (US)

(72) Inventors: Eliot Gillum, San Francisco, CA (US); Kevin Ho Wing Lau, San Jose, CA (US)

(73) Assignee: Vector Flight LLC, San Francisco, CA (US)

( * ) Notice: Subject to any disclaimer, the term of this patent is extended or adjusted under 35 U.S.C. 154(b) by 0 days.

(21) Appl. No.: 16/374,600

(22) Filed: Apr. 3, 2019

(65) Prior Publication Data

US 2019/0228630 A1   Jul. 25, 2019

Related U.S. Application Data

(62) Division of application No. 15/709,026, filed on Sep. 19, 2017, now Pat. No. 10,366,592.

(Continued)

(51) Int. Cl.
*G08B 21/02* (2006.01)
*G01S 19/17* (2010.01)
(Continued)

(52) U.S. Cl.
CPC ........ *G08B 21/0272* (2013.01); *B64C 39/024* (2013.01); *B64D 47/08* (2013.01);
(Continued)

(58) Field of Classification Search
CPC . G08B 21/0272; G08B 21/0275; G01S 19/17; G01S 5/0036; G01S 5/02; G01S 5/0081; G01S 5/0231
(Continued)

(56) References Cited

U.S. PATENT DOCUMENTS

| 7,355,513 B1 | 4/2008 | Brockel et al. |
| 8,380,162 B2 * | 2/2013 | Matsuo ............... H04L 12/1895 455/404.2 |

(Continued)

FOREIGN PATENT DOCUMENTS

| KR | 20160113841 A | 10/2016 |
| WO | WO2014205242 A1 | 12/2014 |
| WO | WO2016142967 A1 | 9/2016 |

OTHER PUBLICATIONS

International Search Report and the Written Opinion dated Jan. 3, 2018, in International Application No. PCT/US2017/052283 filed Sep. 19, 2017.

(Continued)

*Primary Examiner* — Vernal U Brown
(74) *Attorney, Agent, or Firm* — Vierra Magen Marcus LLP (57) ABSTRACT

A beacon detection system which can locate a missing search subject includes: a beacon signal receiver; a location position detector; and a beacon detector. The detector is configured to detect a location of a broadcasting beacon signal associated with a personal device of a search subject within search data covering a geographic search area derived from a search for the search subject, the search data gathered by the beacon signal receiver and location position detector. A computer implemented method of determining a location of a search subject is also provided. The method determines at least a possible connection request from Wi-Fi signals in search data gathered by a Wi-Fi radio covering a geographic search area for a search subject and associated location information to locate the search subject.

17 Claims, 10 Drawing Sheets

Related U.S. Application Data (60) Provisional application No. 62/396,489, filed on Sep. 19, 2016.

(51) Int. Cl.
*G01S 19/51* (2010.01)
*G01S 5/00* (2006.01)
*G01S 5/02* (2010.01)
*B64D 47/08* (2006.01)
*B64C 39/02* (2006.01)

(52) U.S. Cl.
CPC .......... *G01S 5/0036* (2013.01); *G01S 5/0081* (2013.01); *G01S 5/02* (2013.01); *G01S 5/0231* (2013.01); *G01S 19/17* (2013.01); *G01S 19/51* (2013.01); *B64C 2201/145* (2013.01); *G08B 21/0275* (2013.01)

(58) Field of Classification Search
USPC .......................................................... 340/8.1
See application file for complete search history.

(56) References Cited

U.S. PATENT DOCUMENTS

| | | | |
|---|---|---|---|
| 9,094,816 B2 * | 7/2015 | Maier | H04W 4/025 |
| 2003/0052823 A1 | 3/2003 | Carroll | |
| 2006/0218260 A1 * | 9/2006 | Hsieh | H04L 63/0428 |
| | | | 709/223 |
| 2008/0261556 A1 | 10/2008 | McLellan | |
| 2011/0283001 A1 * | 11/2011 | Jung | H04W 28/16 |
| | | | 709/227 |
| 2016/0142884 A1 * | 5/2016 | Sears | H04W 4/90 |
| | | | 455/404.2 |
| 2016/0360562 A1 * | 12/2016 | Chong | H04W 4/025 |

OTHER PUBLICATIONS

Wang et al., "Feasibility Study of Mobile Phone WiFi Detection in Aerial Search and Rescue Operations", Proceedings of the 4th asia-pacific Workshop on systems, apsys '13, Jan. 1, 2013, pp. 1-6, xp055432806, New York, USA.
Office Action dated Apr. 4, 2018, U.S. Appl. No. 15/709,026.
Response to Office Action dated Sep. 4, 2018, U.S. Appl. No. 15/709,026.
Office Action dated Dec. 5, 2018, U.S. Appl. No. 15/709,026.
Response to Office Action dated Mar. 5, 2019, U.S. Appl. No. 15/709,026.
Notice of Allowance dated Mar. 26, 2019, U.S. Appl. No. 15/709,026.
European Office Action dated May 10, 2019, European Patent Application No. 17780569.4.
Response to European Office Action dated Nov. 20, 2019, European Patent Application No. 17780569.4.

* cited by examiner

BEACON DETECTION SYSTEM FOR LOCATING MISSING PERSONS

CLAIM OF PRIORITY

This application is a divisional application of U.S. patent application Ser. No. 15/709,026 filed Sep. 19, 2017, "Beacon Detection System for Locating Missing Persons," which claims priority to U.S. Provisional application 62/396,489 filed Sep. 19, 2016.

BACKGROUND

When people become lost in wilderness areas, rescue workers and emergency responders are often tasked with searching an area of difficult terrain, and possibly unfamiliar surroundings. Often, search vehicles such as helicopters, airplanes, and off-road motor vehicles may be utilized to cover more search area than would be possible by humans searching on foot. With the development of unmanned aerial vehicles (UAVs), commonly referred to as "drones", additional resources can be applied to rescue efforts for lost individuals. One difficulty when searching on foot, or when using both manned and unmanned vehicles, is they generally depend on a visual sighting of the missing party.

SUMMARY

The Technology, briefly described comprises a beacon detection system configured to locate a missing search subject. The system includes: a beacon signal receiver; a location position detector; and a beacon detector configured to detect a location of a broadcasting beacon signal associated with a personal device of a search subject within search data covering a geographic search area derived from a search for the search subject, the search data gathered by the beacon signal receiver and location position detector.

A further aspect includes a search system configured to operate on a search vehicle, including: a Wi-Fi radio capable of broadcasting one or more SSIDs and receiving connection requests for the one or more SSIDs; a location position detector; and a beacon detector responsive to the signal receiver, the beacon detector configured to detect at least a location of a Wi-Fi connection attempt to the one or more SSIDs within search data covering a geographic search area derived from a search for a search subject and gathered by the Wi-Fi radio and location position detector, the connection attempt made by a mobile device associated with the search subject. Other embodiments of this aspect include corresponding computer systems, apparatus, and computer programs recorded on one or more computer storage devices, each configured to perform the actions of the methods.

In another aspect, a computer implemented method of determining a location of a search subject is provided. The method includes: accessing search data including beacon signals and associated geographic location coordinates resulting from a covering a geographic search area for a search subject which is gathered by a Wi-Fi radio capable of broadcasting one or more SSIDs and receiving connection requests for the one or more SSIDs and a location position detector; determining at least a possible connection request from the beacon signals, the connection request associated with a mobile device associated with a search subject; and filtering the data to determine whether the connection request is from the mobile device associated with the search subject; and outputting search information to a search agent, the search information including a location of at least the connection request

DETAILED DESCRIPTION

The technology described herein provides a beacon detection system allowing searchers to more reliably and efficiently search for people associated with the beacon. This detection is useful in search and rescue operations especially in terrain that is difficult to access or see through. In the context of this application, a beacon is any detectable wireless signal which can be generated from any number of different sources. In the context of this application, a beacon will be described with respect to a wireless signal from a personal mobile device, such as a Wi-Fi enabled cellular device, and an radio frequency (RF) signal such as that which may be generated by a mobile device, or a such as that which may be generated by a specific RFID tag or another single-purpose hardware device.

In accordance with the technology, the beacon detection system may be mounted on any type of vehicle, including but not limited to a human being, all-terrain motor vehicle, a manned aircraft and an unmanned aircraft such as a UAV. The vehicle carrying the detection system is caused to search a specific search area, or a sub region of the search area, in order to search for and detect beacons which can then lead rescue workers to the missing individual. The technology provides for a beacon detection system, which may be integrated into or mounted as a retrofit to a UAV or any other search vehicle or person. It should be recognized that the beacon detection system in accordance with the present technology may not be utilized solely with a UAV, the can likewise be utilized with a manned aerial vehicle, or a ground vehicle, or any number of different combinations thereof, all of which comprise "search vehicles". It should be further recognized that the beacon detection system may be mounted on a plurality of search vehicles operated simultaneously over a given search region.

Figure 1:
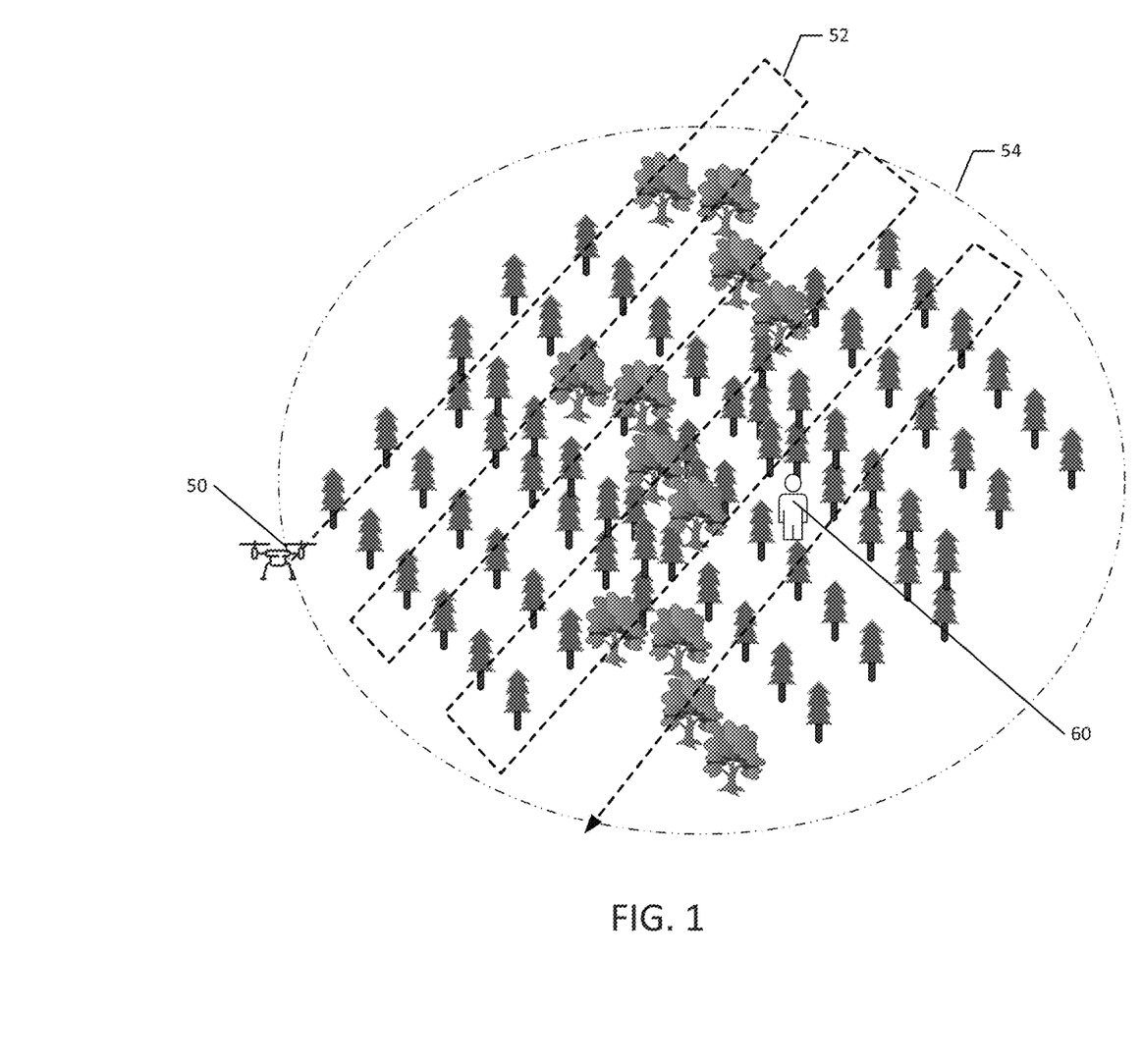
FIG. 1 depicts an overview of a search vehicle flying a search pattern over a portion of a search area.

FIG. 1 illustrates an unmanned aerial vehicle (UAV) (search vehicle) 50 flying a search pattern 52 over a search region or sub region 54. In one context, the vehicle 50 is searching for a beacon associated with a lost search subject 60. In the context of FIG. 1, the unmanned aerial vehicle 50 flies a defined search pattern over a particular search area. The unmanned aerial vehicle 50 includes, as described below, a GPS unit which tracks the position of the UAV 50 in relation to time while the vehicle covers the search pattern. A beacon detector records signal information relative to the position of the vehicle 50 and the search pattern for later analysis to determine the presence of a beacon which may be associated with the search subject 60. It will be understood that the beacon system may be directly connected to the GPS or may match up entries via common clock, and as well that this process may be done in real-time or for later analysis, with the former having the option for real-time communication of results to the operator. It will be understood that the term "search subject" may refer to an individual or multiple individuals.

Although FIG. 1 illustrates a search pattern performed by a UAV, in the context of this technology, the search may be conducted by human hikers over terrain in a plotted search pattern, or by manned or unmanned motorized land travel vehicles, or by manned aircraft.

Figure 2:
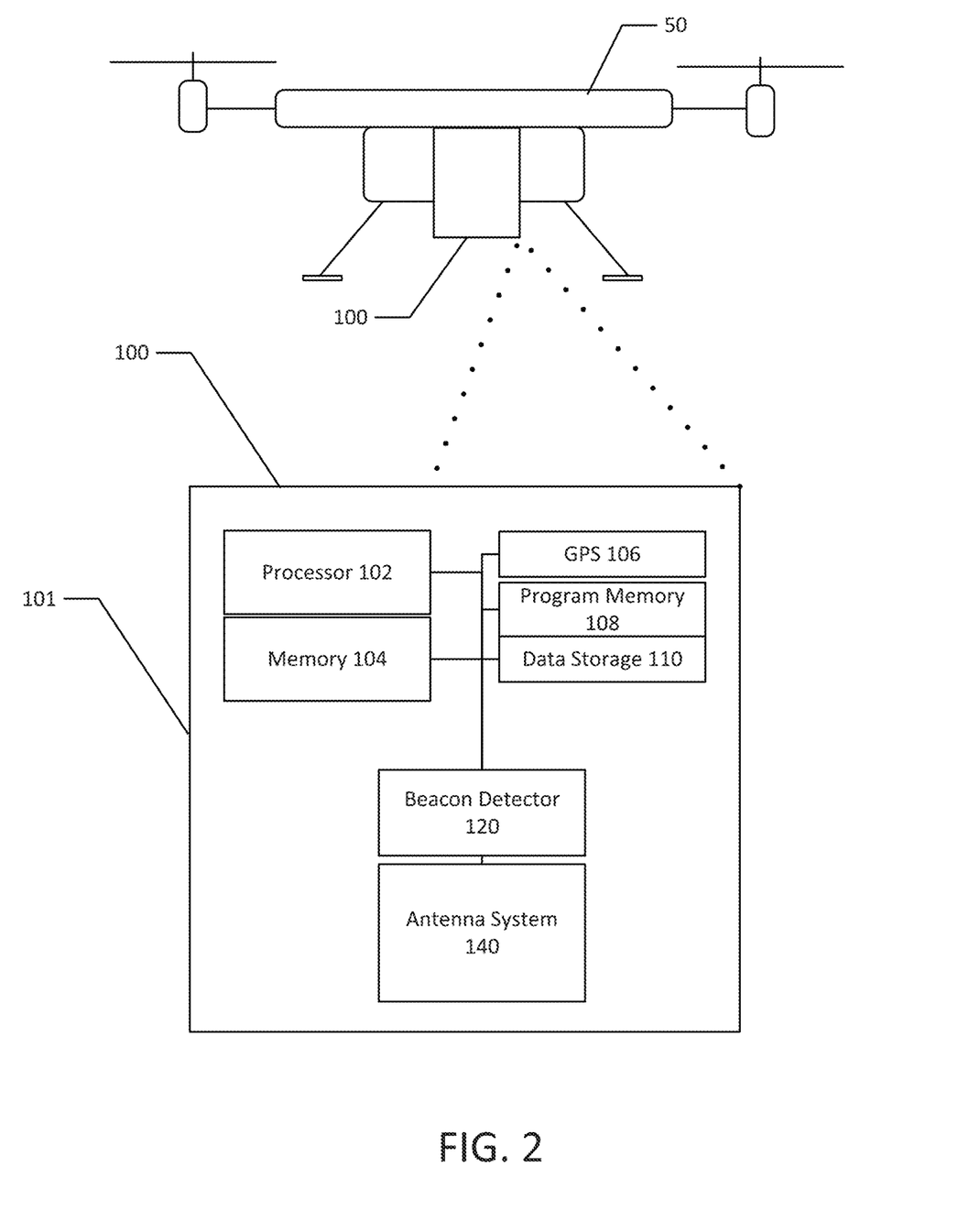
FIG. 2 depicts a first embodiment of a search vehicle and a beacon detection system in accordance with the present technology.

FIG. 2 illustrates a first embodiment of a beacon detection system 100 mounted to an unmanned aerial vehicle 50. In FIGS. 2 through 5, the unmanned aerial vehicle comprises a quad-copter unmanned aerial vehicle, examples of which include DJI Phantom class of drones and Parrot AR class of drones, although many different types of unmanned air vehicles may be utilized in accordance with the present technology. The beacon detection system 100 is mounted on or constructed to be integrated with the unmanned aerial vehicle 50. The system 100 may be contained in a housing 101 which may be integrated into the vehicle or attached to the vehicle. In one embodiment, the beacon detection system 100 includes a processor capable of executing code to instruct the detection system 100 to perform aspects of the beacon detection technology described herein. The system 100 includes a processor accessible memory 104 which may be utilized by the processor 100 in the context of executing the code including instructions to the processor to perform such functions. Memory 104 is commonly referred to as random access memory (RAM). System 100 further includes a GPS radio 106 which is in operable communication with the processor to provide positioning information associated with detection data as described below. The GPS radio 106 is illustrated as part of the system 100 but in operation may be positioned on an upper surface of the search vehicle to allow the best possible communication between the radio and any GPS satellites. A program memory 108 stores program code executable by the processor 110 and data storage 110 to perform the functions described herein.

In the context of this application, a search agent is an individual or group of individuals coordinating a search over a search area, such a search area 54.

Beacon detection system 100 includes a beacon detector 120 and antenna system 140. Various embodiments of the beacon detector 120 and antenna system 140 are described with respect to FIGS. 3 through 5. In this context, the beacon detector 120 includes electronics and/or processing instructions configured to detect a Wi-Fi connection or connection attempt, or an RFID signal from an RFID tag beacon. Beacon detector 120 is illustrated herein in the context of the aforesaid RF and Wi-Fi embodiments. The examples herein are merely exemplary, and numerous variations of the technology will be apparent to one of average skill in the art.

While the antenna system will be illustrated as a particular antenna configuration, it be understood that many different types of antenna configurations may be utilized in accordance with the present technology. One with average skill in the art will recognize that antenna selection is important to maximize sensitivity.

In one embodiment, the processor 102, memory 104, program memory 108, and data storage 110 may be implemented by, for example, a Raspberry Pi—a credit card sized, single board computer developed by the Raspberry Pi foundation and commercially available through a number of sources. However, any suitable processor and memory may be utilized, including a custom built processor and memory configuration. It will be understood that the detector system 100 may be integrated into a single board device, a single chip, or may be composed of individual components arranged in any number of suitable physical arrangements to accomplish the task described herein.

Figure 3:
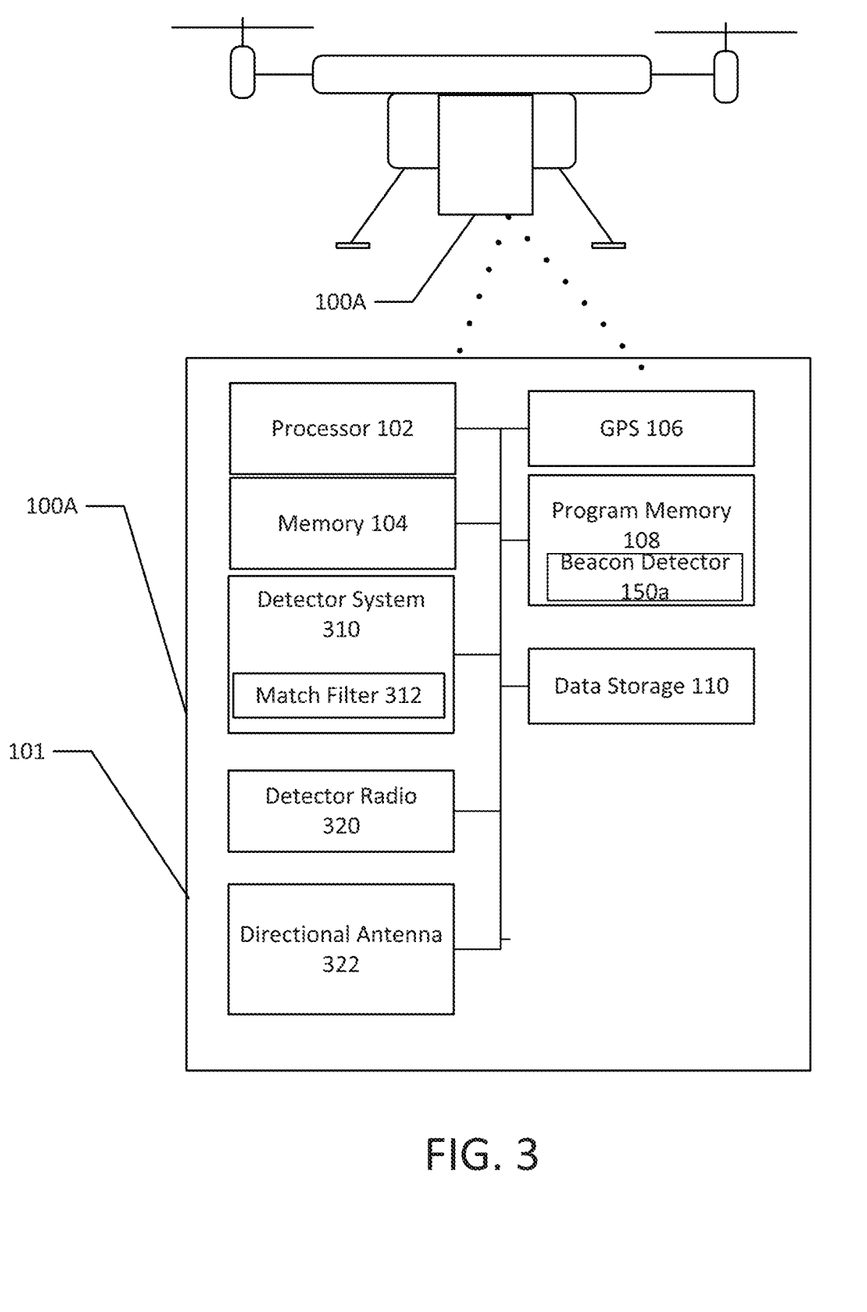
FIG. 3 depicts a second embodiment of a search vehicle and a beacon detection system in accordance with the present technology.
Figure 4:
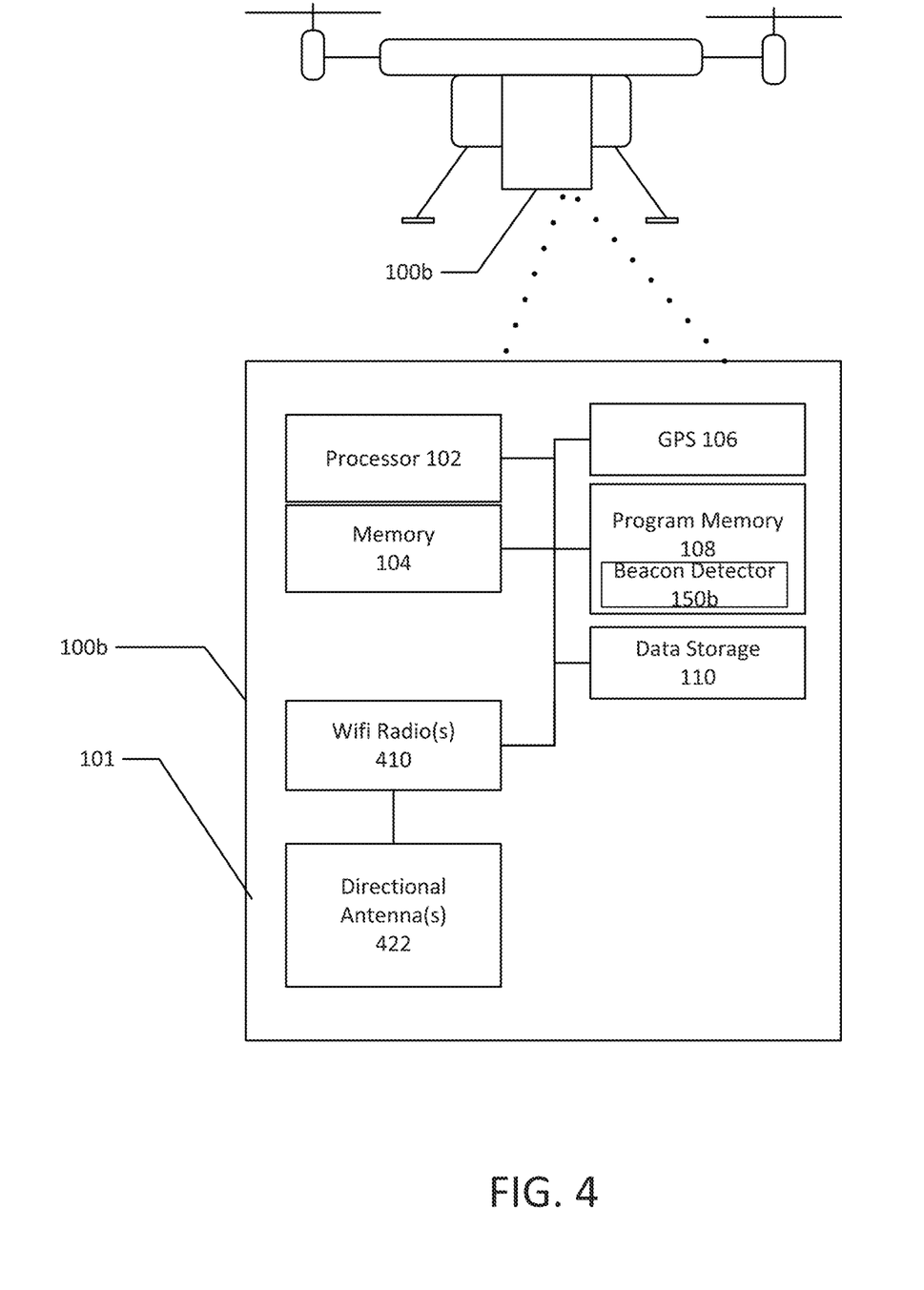
FIG. 4 depicts a $3^{rd}$ embodiment of a search vehicle and a beacon detection system in accordance with the present technology.
Figure 5:
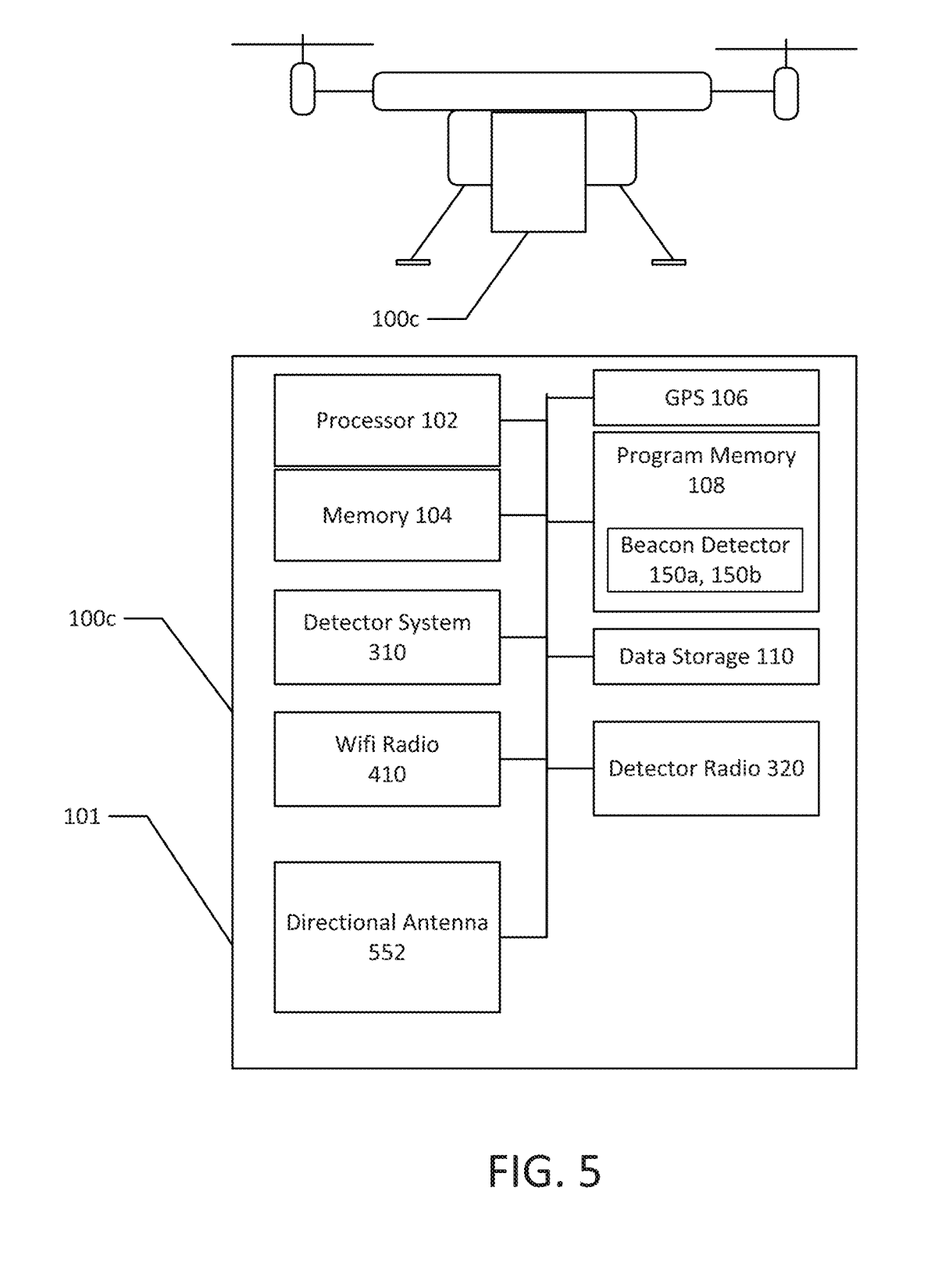
FIG. 5 depicts a $4^{th}$ embodiment of a search vehicle and a beacon detection system in accordance with the present technology.

FIGS. 3 through 5 illustrate various embodiments of the beacon detection system and antenna systems. It should be understood that each of the components having like reference numbers are equivalent components in the respective embodiments.

FIG. 3 illustrates a first embodiment of a beacon detection system 100a, which is designed to search for and detect RFID beacon signals. The RFID beacon signals may be provided by an RFID tag, which is distributed to individuals prior to, for example, the individual venturing into a wilderness area. System 100b includes the processor 102, memory 104, GPS 106, program memory 108, data storage 110 of the first embodiment In FIGS. 3-5 corresponding portions to those of the system 100 of FIG. 2 provided with the same reference numbers as those of the embodiment of FIG. 1, and hence explanations of the corresponding elements are omitted.

Radio-frequency identification (RFID) is a technology uses electromagnetic fields to automatically identify and track signal emitting tags which may be attached to objects. The tags contain electronically stored information. This is important to be able to distinguish the locations of desired individuals from individuals not of interest to the search at hand. Passive tags collect energy from a nearby RFID reader interrogating radio waves. Active tags have a local power source such as a battery and may operate at hundreds of meters from the RFID reader.

In accordance with the technology, the RFID tag searched for by the beacon detection system 100 is generally comprised of an active RFID tag. The RFID tag may take any general shape or configuration, but may, for example, be attached to a piece of clothing or backpack of an individual before the individual ventures out into a wilderness area.

The beacon detection system 100a illustrated in FIG. 3 includes a RFID detector system 310 which may include a match filter 312, a detector radio 320, and directional antenna 322. Directional antenna 322 may be a yagi-uda antenna, moxon, or antenna array, or any other type of suitable directional antenna having an appropriate field of view. As discussed below, the antenna field of view may be utilized to compute a search pattern for the search vehicle 50 in the search region. Detector radio 320 may be a passive reader, which receives radio signals from active tags, or may be an active reader which transmits interrogator signals and receives authentication replies from RFID tags. Detector radio 320 may therefore comprise a broadcast radio and a beacon signal receiver, or just a beacon signal receiver. RFID systems may operate in the 433 MHz range. Thus, in this example, detector radio 320 is capable of detecting RFID tags in this spectrum and directional antennas 322 are optimized for detection around this frequency. The RFID detector system 310 can be a system capable of discriminating the RFI signal from an RFID tag. In one embodiment, the RFID detector system 310 includes a matched filter 312. The matched filter is utilized in accordance with the present technology to detect identifiable signals from the RFID tag. In one embodiment, the RFID detector system may comprise a software defined radio provided as code executed by processor 110 or as an embedded system used in conjunction with the processor and memory of system 100*a*. A method for detecting the RFID signals is discussed below.

A beacon detector 150*a* is provided in program memory 108. The beacon detector is operable to perform the functions described in, for example, the various embodiments of steps 520 and 530 which are associated with detecting RFID signals.

FIG. 4 shows another embodiment of a beacon detection system 100*b*, which is designed to detect a Wi-Fi signal from a mobile device, such as a mobile cellular phone. One advantage of the system of FIG. 4 is that no active involvement by the missing person or beacon, such as attaching the RFID tag to the person before heading out into the wilderness, is needed. Generally, the proliferation of mobile devices with Wi-Fi capability means that many missing individuals will be already carrying a mobile device with Wi-Fi capabilities. The system of FIG. 4 takes advantage of this using any of a number of different techniques to detect a mobile device within a search area. In one embodiment, the detection system 100*b* generates an access point with a one or more SSIDs to which a mobile device can connect, and detects a connection or an attempted connection by a mobile device as a beacon which can be associated with a particular individual.

As used herein, a "mobile device" includes any personal device associated with a user including but not limited to a cellular enabled personal device such as a cell phone, a tablet, notebook, or any other general purpose computing environment which is associated with an individual and which may be carried with the individual.

Wi-Fi is generally defined as wireless local area network (WLAN) products that are based on the Institute of Electrical and Electronics Engineers' (IEEE) 802.11 standards. Wi-Fi is generically used to refer to the 2.4 GHz 802.11b standard, or any type of network or WLAN product based on any of the 802.11 standards, including 802.11b, 802.11a, dual-band, and so on.

Detection system 100*b* includes one or more Wi-Fi radios 410, each of which may be coupled one or more directional antennas (or antenna arrays) 422. In an alternative embodiment, only one Wi-Fi radio (such as radio 410) is used. In another embodiment, one Wi-Fi radio is used for broadcasting SSID(s) and another Wi-Fi radio or radios are used to listen for SSIDs. In a further alternative embodiment, multiple Wi-Fi radios are connected to one processing device in order to search for multiple people or cover multiple fields of view or even the same field of view multiple times. In the context of detecting a beacon, Wi-Fi radio 410 acts as a typical Wi-Fi access point, transmitting a SSID (which may be known to the mobile device or unknown to the mobile device) to provide an access point connection to allow the mobile device to connect to the system 100*b*. In this embodiment, radio 412 monitors for attempted connections to the broadcast SSIDs transmitted by radio(s) 410 and may be utilized by the system 100*b* to monitor connection signal strength and other characteristics of received connection attempts to determine if an attempted connection is made by a mobile device of a search subject. That is, Wi-Fi radio(s) 410 broadcasts one or more SSIDs and acts as a regular connection point for any Wi-Fi radio attempting to make a connection to it. If a connection is made, the system 100*b* may complete the connection, assign a DHCP address, and attempt to maintain the connection between the beacon (the connecting radio) and the radio 410, or may use information associated with a connection attempt to provide search agents with a location fix on the search subject. In other cases, where a beacon radio cannot connect, Wi-Fi radio 412 monitors connection signals and packets which may or may not make a connection with the first Wi-Fi radio 410 and may determine the signal strength and other characteristics of the connecting signal. In alternative embodiments, the radio 410 may broadcast the SSID but not respond with DHCP, since a single packet from the beacon is all that is required to localize the desired individual. This information may be utilized by the search agent to determine that additional searching in the geographic location where the detection occurred is needed. In this embodiment, the Wi-Fi radios may look for a connection to a specific SSID and the other radio may look for the signal strength of the incoming connection. Each of the Wi-Fi radios 410 may therefore comprise a broadcast radio and a beacon signal receiver, or just a beacon signal receiver.

Multiple directional antennas 422 and 424, may be provided. Each directional antenna may be separately coupled to one of the Wi-Fi radios, or may be configured as an antenna array having a known field of view. In this embodiment, the antennas 422 and 424 are optimized to detect signals operable in the 2.4 Ghz range to detect Wi-Fi connections from a beacon source. It will be understood that, in some contexts, unidirectional or other antennae will be most appropriate.

A beacon detector 150*b* is provided in program memory 108. The beacon detector is operable to perform the functions described in, for example, the various embodiments of steps 520 and 530 which are associated with detecting Wi-Fi signals.

FIG. 5 illustrates another embodiment of the detection system 100*c*. In the embodiment shown in FIG. 5, both an RF detector and a Wi-Fi detector are jointly utilized. One advantage of the system of FIG. 5 is that it can be utilized with either an RFID tag or a Wi-Fi Beacon. Another advantage of the system of FIG. 5 is that the RFID detection technology can be utilized to further analyze Wi-Fi signals which may be detected by the Wi-Fi system. This includes performing a signal analysis similar to that described below which is performed in the RFID embodiment to determine aspects of a Wi-Fi connecting signal which may not be apparent using one or more Wi-Fi radios (e.g. radio(s) 410). For example, the RF detector system 310 may be utilized to search for the Wi-Fi frequency (in conjunction with the RF signal) so that in cases where an incomplete Wi-Fi packet or no Wi-Fi packets are actually detected, the Wi-Fi signal can still be detected by the RF detection technology. As illustrated in FIG. 5, system 100c includes the detector system 310 and detector radio 320 of the embodiment of FIG. 3, as well as the Wi-Fi radio(s) 410 from the embodiment of FIG. 4.

Multiple beacon detectors 150a and 150b, equivalent to those set forth above, are provided in program memory.

Figure 6:
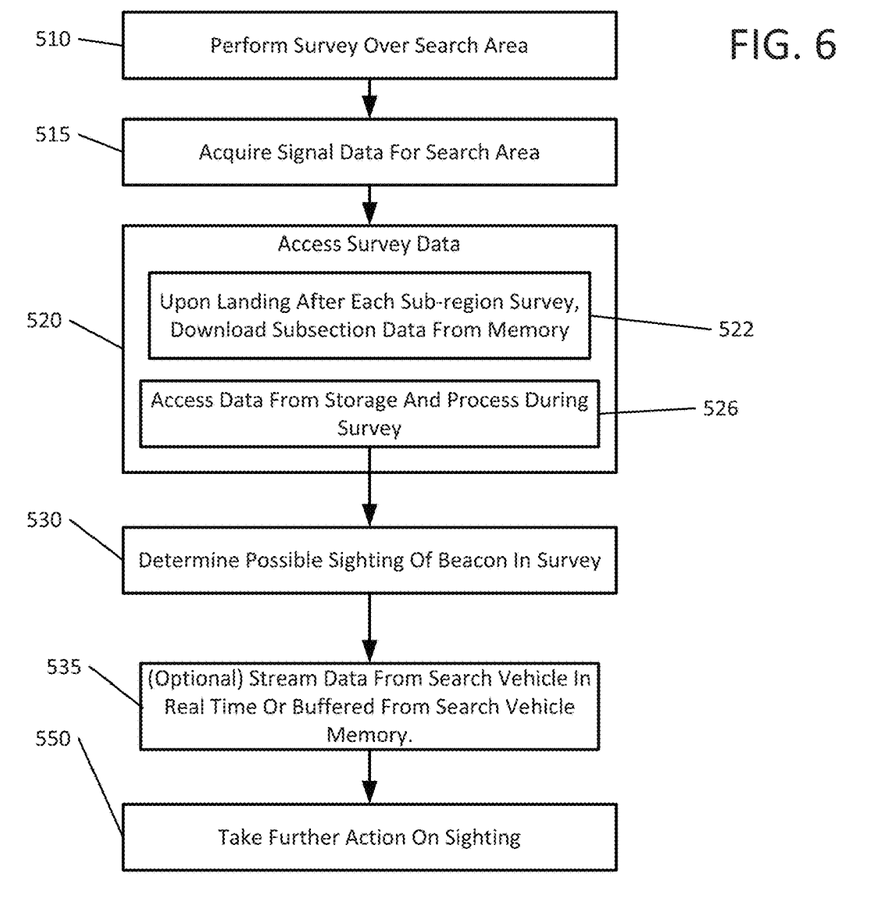
FIG. 6 depicts a flowchart illustrating a first embodiment of a method for detecting beacons in a search area. In accordance with the present technology.

FIG. 6 is a flowchart illustrating one method for implementing the present technology. Each of the methods illustrated in FIGS. 6-11 may be performed by hardware only, or hardware and software (executing for example on processor 102).

FIG. 6 is a flowchart illustrating a method which takes advantage of the present technology to detect beacons which may be associated with a person or entity for which a search is underway. At 510, a survey for a defined area is performed. FIG. 1 illustrates a UAV surveying a defined area or subregion of an area. At 515, signal data associated with locations are acquired during a search performed in the search area. Embodiments for acquiring signal data are discussed below. At 520, the survey data is accessed by a search agent or a processing device to determine whether one or more indicators of a search subject are present. Indicators may include an RF signal detection or a Wi-Fi connection or connection attempt.

Figure 7:
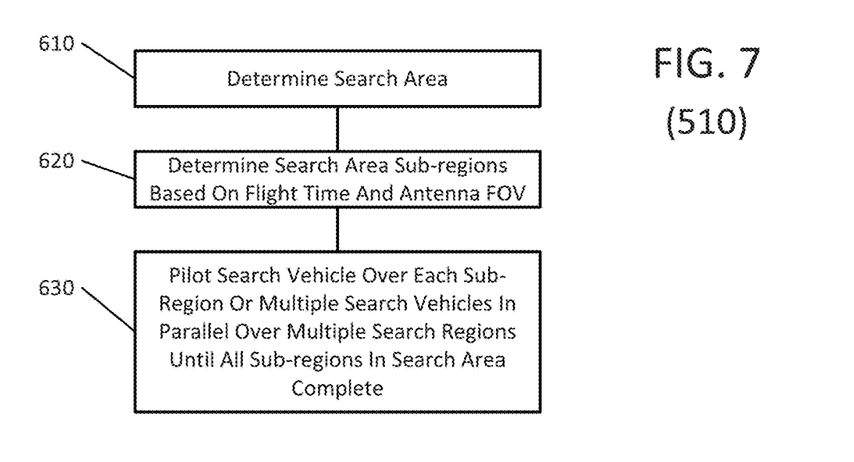
FIG. 7 illustrates a method of performing a survey over a defined area.

FIG. 7 illustrates one embodiment for performing a defined survey at 510. Generally, the survey includes determining a search area 610, defining the search area into search area subregions based on a flight time and the antenna's field of view at 620, and piloting a search vehicle over each of the subregions or multiple search vehicles and parallel over multiple subregions until all subregions search area are complete at 630.

At 610, because each of the antennas has a known field of view for a given flight height of a search vehicle, and each search vehicle generally has a known maximum flight time over the search area (including time to travel to and from the search area to a search agent base of operations), a search agent can, for a given search area, develop known search subregions and flight patterns over the search subregions. Because generally the search area which is required when looking for a missing individual is quite large, a search area will be broken down into several subregions. Following a flight over particular subregion 630, a search vehicle will return to the search agent to be outfitted for another search of a particular subregion. As discussed herein, multiple search vehicles each with a beacon detection system may be operated together to cover the entire search area.

Likewise, multiple search agents in land vehicles or hiking may carry detection systems as described herein to cover a search area on the ground.

Returning to FIG. 6, at 515, signal data is acquired during the survey at 510. Acquiring signal data includes monitoring radio signals in the area for either a Wi-Fi connection attempt, or for particular patterns within a RF signal. Note that particular patterns within a Wi-Fi signal can also be monitored when the system detector 100 is utilizing the RF radio technology. In accordance with the technology, acquisition of signal data at 515 includes acquiring a plurality of samples, (on the order of, hundreds, thousands, or millions of samples per second) with each sample having at least associated signal data, GPS location data, and a timestamp. In this manner, the location of the survey vehicle when it acquired the particular signal data can be determined, and this information utilized to perform further actions on the data.

At 520, the survey data which is acquired at 515 is accessed. Three sub steps 522, 524 and 526 illustrate various embodiments (used alone or in combination) for accessing the data acquired at 515. In one embodiment, survey data acquired at 515 is stored in data storage 110 in each of the different beacon detection systems. In this embodiment, at 522, upon landing after each subregion is surveyed, survey data from the survey is downloaded from the memory In another embodiment, survey data can be accessed by the processor 102 executing instructions in program memory 108 to analyze the data in accordance with the analytics discussed below at 526 while the survey is being conducted. In yet another embodiment, at 524 data which is stored in the data storage 110 can be streamed from the search vehicle in real-time or buffered from the search vehicle memory data storage 110 to the search agent while the survey of the defined area is being performed.

At 530, a determination of a possible sighting of beacon in the survey area is determined. Determining a possible sighting of a beacon is described below with respect to FIGS. 8 and 9, and is dependent upon whether or not the RF embodiment, or the Wi-Fi embodiment, or a combination thereof, is in use. Finally, at 550, further action on the sighting may be taken. Such further action may be a decision to return the search vehicle to a designated area, send individual searchers on foot into the area, or other similar actions.

In this respect, further action at 550 may include directing the search vehicle to return to the identified location where the signal connection was made in order to acquire additional data, either by manually flying the search vehicle to the area, or using a feedback loop to a flight controller in the vehicle to have a return to the area together data until such time as it can no longer remain aloft and safely return to the search agent.

Figure 8:
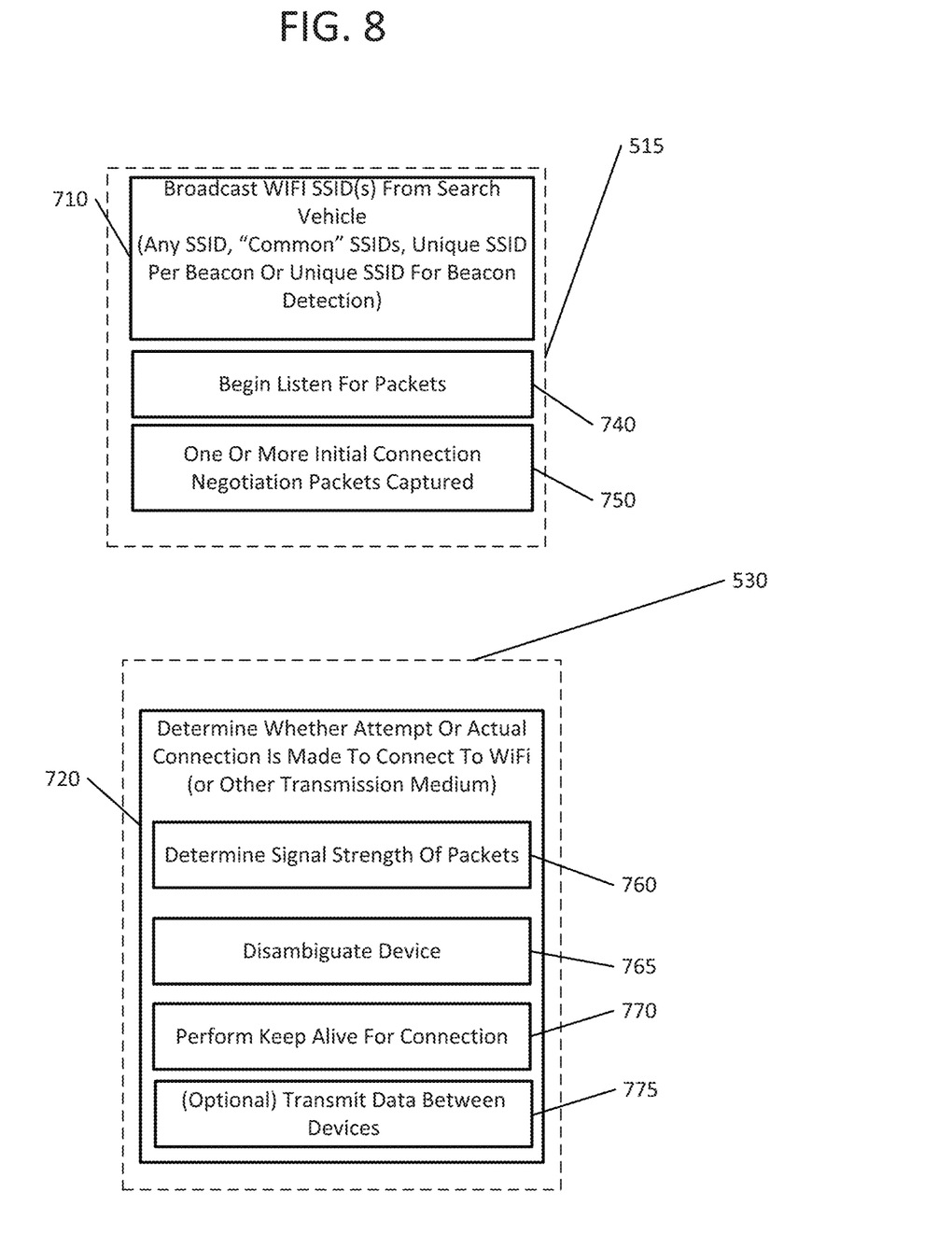
FIG. 8 illustrates a first embodiment of a method for acquiring signal data and determining a possible sighting of a beacon in survey data.
Figure 9:
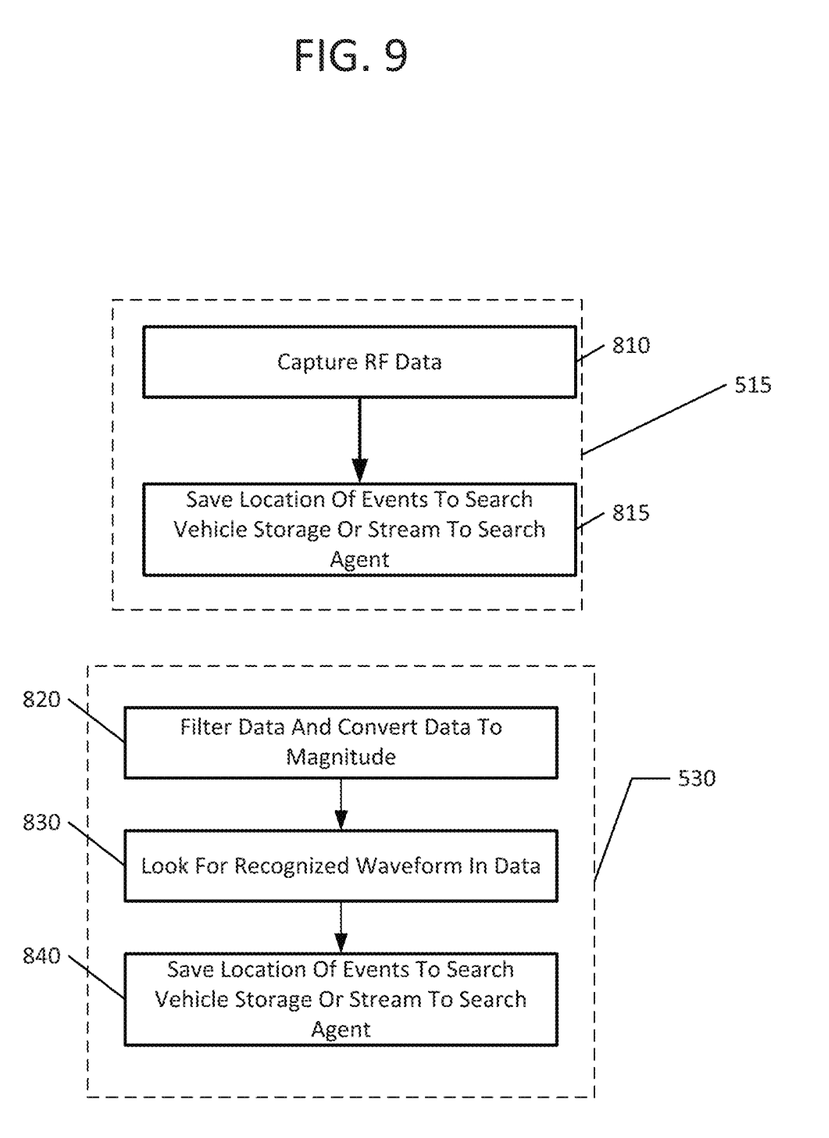
FIG. 9 illustrates a second embodiment of a method for acquiring signal data and determining a possible sighting of a beacon within the survey data.

FIGS. 8 and 9 illustrate two embodiments for performing steps 515 and 530 in FIG. 6.

In FIG. 8, detection of a Wi-Fi signal from a mobile device using a system 100 such as that in FIG. 4 or 5 is described. In the context of FIG. 8, and as described below, a mobile device may have a search identifier application installed which may work in conjunction with the detection system 100 to enhance the accuracy of the search process. In other cases, no search identifier application may be installed. A search identifier application is discussed below with respect to FIG. 11. The technology allows for detection of the mobile device of a search subject whether or not the search identifier application is installed.

At 710, one of the broadcast Wi-Fi radios broadcasts one or more Wi-Fi SSIDs from the detection system in the search vehicle. The broadcast SSIDs may be any SSID, a unique SSID for the beacon which is sought, or a unique SSID for the beacon detection system. In one configuration, the user may configure a mobile device to search for a particular SSID for a search system run by a search agent. For example, a hiker may configure a mobile device to search for the SSID "rescue" and configure the device's the Wi-Fi settings to connect to that network whenever it is seen. This "rescue" network is or may be a generic name for the rescue system operated by the system agent. In another embodiment, the mobile device may be configured to connect to a device-specific SSID. This SSID may be, for example, the users name and a hash of the MAC address of the network component of the mobile device.

In another configuration, multiple SSIDs which are common commercial SSIDs may be broadcast. For example, commonly used SSIDs of, for example, coffee house or hotel chains to which the mobile device of a search subject is likely to have connected in the past may be broadcast in order to generate an attempt from the mobile device to connect to the common commercial SSID. In some cases, one connection attempt is all that may be necessary for the search agent to gather sufficient information to locate a search subject.

The SSIDs may be broadcast from one or multiple Wi-Fi radios in the embodiment shown in FIG. 4, or FIG. 5.

In a further embodiment of the configurations of FIG. 4, or FIG. 5, the detection system may broadcast a separate administrator SSID allowing search agents to connect to and control the detection system 100 during the search process. Having the separate admin network makes it easier for the searchers to connect and to detect the mobile device of a search subject because target device packets will never connect to the admin SSID. Thus, in certain cases, any attempt to connect to any SSID other than the admin network may be considered data of relevance in finding a search subject.

At 710, in accordance with the foregoing discussion, signal samples are continuously acquired in the search area, along with the location of each event (signal record), the time of each event, and the GPS coordinates of the event. Each event is stored to the search vehicle storage (such as data storage 110) or is streamed to a search agent, or processed by processor 102 and memory 104 in accordance with instructions stored in the program memory.

At 720, a determination is made as to whether a WiFi connection is made or an attempt is made to connect to one or more of the broadcast SS ID or SSIDs. Step 720 is one example of performing step 540 in FIG. 6. At 740, each of the Wi-Fi radios will listen for packets. At 750, one or more initial preamble packets of a Wi-Fi connection attempt will be received. If the packet is a complete packet and a connection can be made, one of the Wi-Fi radios will complete the Wi-Fi communication protocol and allow a connection by the beacon to the one or more broadcast SSIDs. The receiving Wi-Fi radio may attempt to measure the signal strength of the connecting beacon and record this data. At 760, signal strength the packets may be determined, and if a connection is made, at 770, the system 100 attempt to keep the connection between the Wi-Fi radio on the search vehicle and the mobile device active. In this respect, this may include, for example, issuing a DHCP address to the mobile device in order to create a network connection between the search vehicle mobile device, or simply pinging the mobile device to attempt to keep the mobile device active to in order to acquire additional data which may help to localize the beacon.

At 765, in various embodiments, one or more techniques for disambiguating a mobile device from other mobile devices may be utilized. In an embodiment, information in the preamble packets associated with a Wi-Fi connection or DHCP lease negotiation may be utilized to disambiguate the mobile device of the search subject from other signals which may be received. For example, in a DHCP lease negotiation, a client identifier is typically supplied in the initial lease negotiation. In devices using Apple Corporations iOS, the identifier is typically the name of the device identified in the device settings. This information may be captured by the detector system 100 and utilized to identify the search subject's mobile device.

In another aspect, the mobile device's media access control address (MAC) address. A MAC address is a unique identification number which represents the device in a network. The first 3 bytes (24 bits) of a MAC address specify an OUI (Organizationally Unique Identifier) which is assigned by the IEEE Registration Authority. Using the unique identification number and the public listing of the IEEE Registration Authority, the system 100 can disambiguate device by manufacturer such that if a search subject's mobile device manufacturer is known, connection attempts made to a detection system identify likely candidates for the search subject' mobile device.

FIG. 9 illustrates a second implementation of steps 515 and 530 where an RF embodiment is utilized. At 810, RF data is captured for example by the antenna 322 and detector radio 320, over a series of samples in the search region or sub region. At 815, the location, time, and signal data is stored in search vehicle data storage 110, or streamed to a search agent. Alternatively, as discussed above, the operations of step 530 described herein at 820, 830 and 840 can be performed by the processor 102 in real time by the system 100. At 820, the in-phase and quadrature data is converted to magnitude. The magnitude data is useful in this context in applying the received data to a match filter. The match filter output is analyzed and at 830, a process looks for the area of the square wave (in both positive and negative amplitudes) which matches a particular pattern. This can be the pattern of the RFID tag, or a pattern of a Wi-Fi packet, or only a part of either. In one embodiment, the pattern includes nine associated peaks and valleys (positive and negative amplitudes) which identify the received signal as that of a particular RFID tag which is being sought. Hence, at 830, the system looks for recognized waveforms in the data utilizing the match filter. At 840, the detected wave form and position output to search vehicle storage or the search agent for processing in accordance with step 550.

Figure 10:
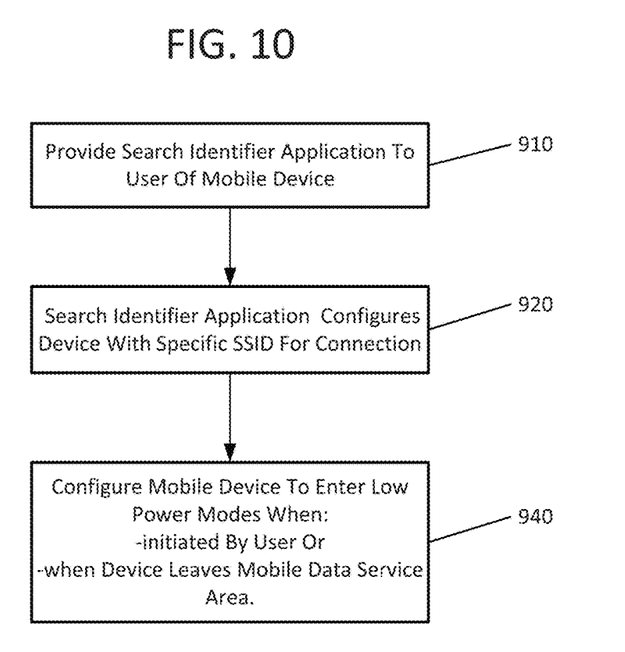
FIG. 10 illustrates a method of providing a search identifier application to a user of a beacon such as a wireless mobile device.

FIG. 10 is a method illustrating one embodiment for configuring a mobile device. In one aspect, discussed above, a user may configure a mobile device to look for a particular SSID of a Wi-Fi network. In another embodiment, illustrated in FIG. 9, a user may be provided with an application which configures multiple aspects of a mobile device. At 910, a search identifier application is provided to the user of the mobile device. The search identifier application may be downloaded utilizing any of a number of known application stores associated with known mobile devices. At 920, the search identifier application operates programmatically to configure the mobile device to look for a specific SSID or connection activity. As noted above, this may include providing a unique SSID for each device, known to the search agent. At 930, the search identifier application may register the mobile devices MAC address and/or unique SSID with a search database for search information accessible by the search agent, along with typical information such as name and contact information. This can be an association of the MAC address with the mobile device, or an association of a particular SSID with a MAC address and/or user. At 940, the application can operate programmatically to configure the mobile device to enter power saver mode when either specifically initiated by user, or when the device leaves a mobile device service area. For example, when the mobile device leaves a cellular service area, the device and automatically enter a mode where it becomes detectable by the beacon detection system 100, but conserves power. In such a mode, the device may enter a so-called "airplane" mode, which places all of the services of a particular mobile device in suspension, but the application may likewise enable Wi-Fi to allow the Wi-Fi beacon detection of the present technology to occur.

Figure 11:
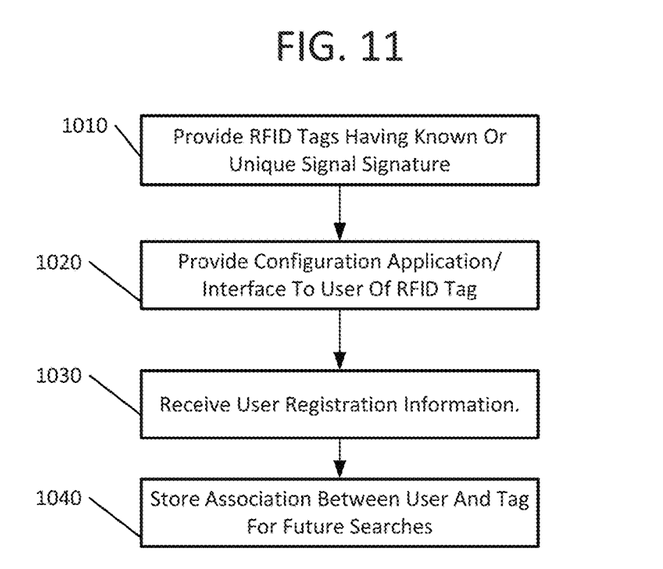
FIG. 11 illustrates an embodiment of the technology utilizing an RFID tag in accordance with the present technology.

FIG. 11 illustrates a method of configuring RFID tags with an association to a user or individual. At 1010, RFID tags having known or unique signal signatures are distributed to users. At 1020, a search identifier application or interface is provided to the user of one such RFID tag. The application may be a mobile device application or provided, for example, via a web-browser, allowing a user to register an RFID tag to a particular user. In this context, RFID tags may be distributed to a user, and the user may be prompted to configure the RFID tag to associate the RFID tag with the user such that if the user embarks on an activity with the possibility of being lost, carrying the RFID tag will provide a unique signature which can be sought by the beacon detection system 100 when searching for the user. This allows the beacon detection system 310 (and match filter 312) to be specifically tuned to the particular RFID signal. At 1030, user registration information can be received by the application or the interface and at 1040, an association between user and the tag can be stored for future reference in future searches. A hybrid of this process could also occur for a Wi-Fi tag which may be hardware independent of cell phone or other general purpose computing device where the Wi-Fi tag is designed for the specific purpose of being located when lost.

Figure 12:
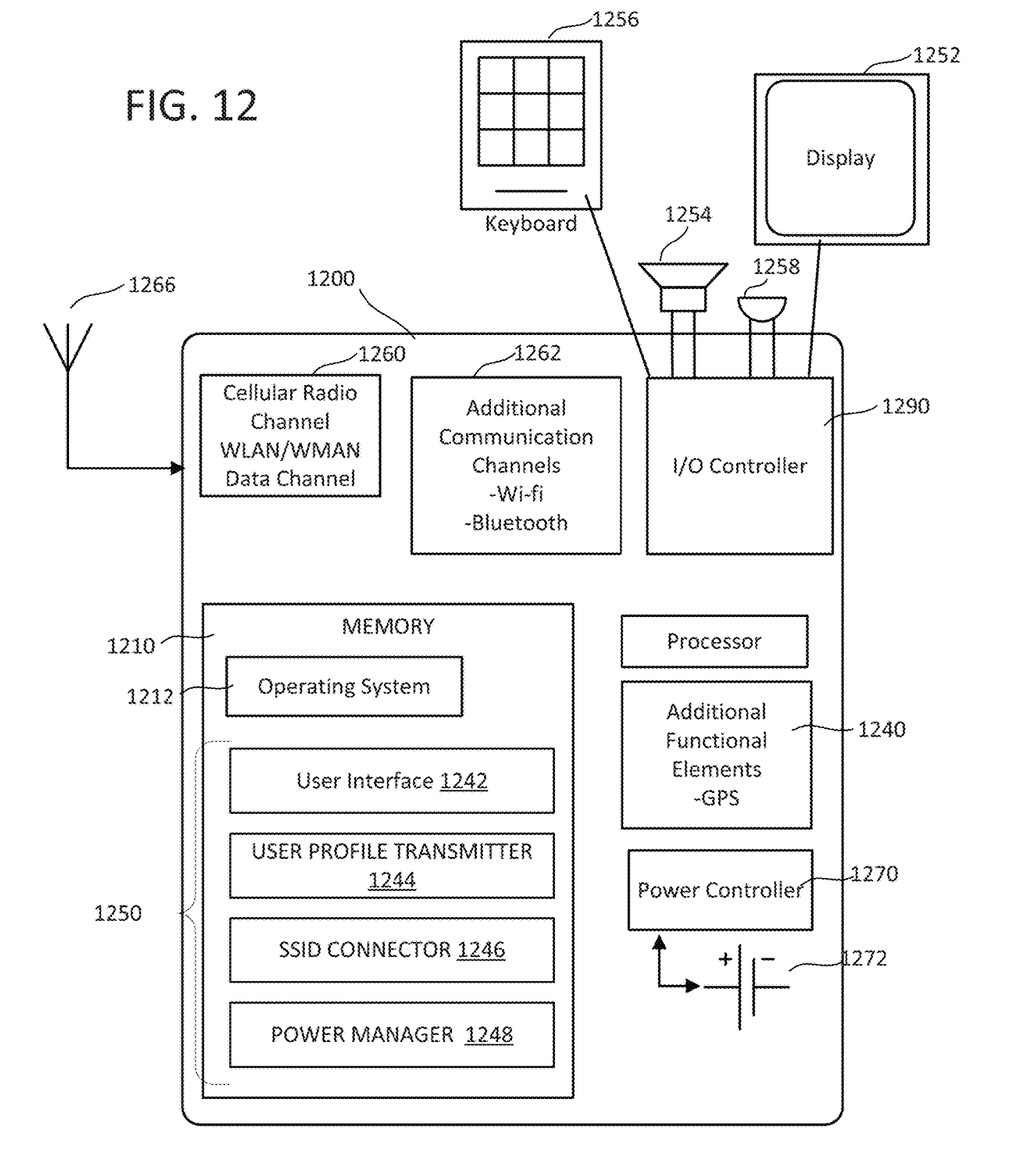
FIG. 12 illustrates a mobile device incorporating a search identifier application therein.

FIG. 12 illustrates components of a mobile device application such as a search identifier application provided in a mobile device 1200. The mobile device application 1240 may be executed by the processor of a mobile device 1200. The application includes a user interface 1242, a MAC address transmitter 1244, a SSID connector 1246, and a power manager 1248. The user interface 1242 may include various screens and input/output prompts guiding the user through a configuration process which makes the mobile device easier to detect to the detection system 100. In one embodiment, this can include a registration process whereby a user of the mobile device provides information to the application which identifies the user, certain aspects of the mobile device and user information to be stored in a registered individual database (e.g. a "registry") for use by the detection system when an individual goes missing. This information can include the mobile device type, MAC address and configuration information of the mobile device. The MAC address transmitter 1244 ensures that the mobile device provides a correct MAC address to the registry by capturing the address from the mobile device. The SSID connector configures the mobile device to attempt to connect to a specific SSID (examples of which are discussed above) of a detection system which may uniquely identify the search subject. A power manager may be enabled to control various aspects of the mobile device 1200 to conserve battery life in a search situation. Many devices have low-battery power-saving modes. The power manager enhances the ability of the FIG. 12 includes a depiction of an example of typical architecture for a mobile device. The mobile device 1200 has memory 1210, processor 1240, an input/output (I/O) controller 1290, a cellular radio channel and WLAN/WMAN data channel 1260, and power controller 1270. Each of these components may connected through a system bus (now shown).

Memory 1210 includes the mobile device's operating system 1212, and one or more applications, including search identifier application 1250 and comprises volatile and non-volatile storage. The operating system 1212 handles the different operations of the mobile device 1200 and may contain user interfaces for operations, such as placing and receiving phone calls, text messaging, checking voicemail, and the like.

The operating system 1212 manages the hardware of the mobile device 1200, including hardware such as the display 1252, speaker 1254, keyboard 1256, and camera 1258. The operating system 1212 also manages software (i.e. applications) on the mobile device 1200 for performing tasks requested by the user and handling incoming data, for example. The power controller 1270 of the mobile device 1200 allocates power from the mobile device's power supply 1272 to the circuitry for different mobile device components used to operate the mobile device 1200 and its different features.

The mobile device 1200 also contains a cellular radio channel and WLAN/WMAN data channel 1260 for receiving and transmitting data, such as phone calls, text messages, email, webpage data, and the like. Cellular radio communication can occur through any of the standard network protocols of mobile device communication (i.e. GSM, PCS, D-AMPS, UMTS, and the like). The mobile device 1200 may also contain additional communication channels 1262, such as Wi-fi, Bluetooth, and the like, for receiving and transmitting data as well. The mobile device 1200 may have additional functional elements for communication 1264, such as GPS. Each of the described communication mediums is accessed via the antenna 1266 on the mobile device 1200. The communication mediums for operations of the mobile device 1200 are not limited to the mediums described and can include any other communication mediums known in the art.

In a further aspect, multiple-input and multiple-output, or MIMO techniques may be used to provide directional bearing information of a search subject. If the WIFI radios with MIMO functionality are used, such radios may be accessed programmatically. Each detection event provides sufficient information to estimate directional bearing information.

In still other embodiments, the detection system 100 may be provided with an audio and/or visual indicator of the detection of a beacon. For example, a beeper or flashing visual light may indicate to searchers that a detection event has occurred. This would allow searchers on foot to more be made aware of the possible proximity of a search subject.

Search agents may likewise be provided with a control device, which may be a mobile device such as that illustrated in FIG. 12, which may include an application allowing users to analyze and visualize search data in accordance with the discussion herein. For example, the analysis described in FIGS. 8 and 9 may be performed on the device in cases where data is downloaded after a search of a search area is performed or streamed to the search agent's device during the search process. The application may allow for visualization of the search data by plotting detection events on a computer generated map using GPS coordinate data associated with the event. Multiple detection events may be clustered to provide additional visibility relative to data associated with the event. For example, multiple detection events may be clustered by signal strength in a user interface, allowing a search agent to determine best-likely search areas for search subjects.

When the present technology is embodied by a mobile phone or other computing environment, such computing environments offer capabilities that would be more difficult to offer elsewhere. Messages between victim and searchers can be sent or received during potentially brief connectivity between any two systems, and used to alert the victim they they've been found, instructions on how to treat an injury, or give the searchers detailed status of the victim. With longer or repeated connectivity, a two-way dialogue is possible. This conversation could take the form of text, audio, or even video, and especially given the A/V capabilities of devices on both sides.

In addition to location and communication that can be provided over this unique Wi-Fi link, the presence of an application on a mobile device can be used to provide additional functionality for those leaving or operating on the fringe of cell phone connectivity. Weather reports and alerts, trail maps, safety and first-aid tips, contact info for emergency services, notification of personal emergency contacts in the case of a failure to return or check in on time. This functionality could be made available directly to consumers via a "first party" app or added to third party applications via a software development kit (SDK). The data could be received via cellular networks, fixed special-purpose Wi-Fi networks that either gather the data themselves (e.g. weather) or relay it from another type of link, or peer to peer transmission that takes advantage of the movement and/or connectivity of individuals in the network.

Again because of the great software and hardware capabilities of modern mobile phones, another embodiment involves user phones, rather than specialized hardware, to search for victims. This is advantageous because search and rescue teams would have essentially free access to search equipment or, in a less remote search environment, other users of the system could opt in to automatically and silently becoming part of the search team as they move about the world. The latter has great potential for locating kidnapped children, for instance.

It should be noted that, particularly with Wi-Fi's general use and availability, the ability to be located could be misused, whether to simply violate its users' privacy or worse. A practical scheme to effectively prevent misappropriation of the system is to assign each user a unique Wi-Fi network ID (known as SSID) such that it could not be predicted in advance or brute forced in real-time and cause the phone to respond and give away its presence and location. This unique ID system could be as simple as a keyed hash of the user ID, personal information, or system generated per-user information.

In all embodiments of RF-based technologies, additional embodiments may use direction finding antennae and techniques to augment the information gained from a detection event. This is in addition to an RF receiver system, for example, by using multiple receivers and adding them together with various phase delays. Newer Wi-Fi standards apply similar techniques to form beams and gain sensitivity, range, and bandwidth. The present technology can take advantage of such advances implicitly or perhaps even explicitly with sufficient API access or replication of standard protocols.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the system described could be used to locate a wide variety of targets and in various scenarios, like first responders while they're also looking for the missing victim, fire fighters in brush fires, police serving warrants, wandering elderly, lost children, horses, or dogs.

What is claimed is:

1. A beacon detection system configured to locate a missing search subject using a Wi-Fi enabled personal device associated with the search subject, comprising:
    a Wi-Fi signal receiver;
    a location position detector configured to detect a position of the Wi-Fi signal receiver; and
    a Wi-Fi detector configured to detect a connection attempt by the Wi-Fi of the personal device to connect to a Wi-Fi signal broadcast by the system, the Wi-Fi signal having a unique SSID that the personal device of a search subject has been pre-configured to attempt connections to, the system determining the location of the personal device by associating the connection attempt with a location detected by the location position detector in a geographic search area from a search for the search subject, the search data gathered by the movement of the Wi-Fi signal receiver and location position detector in the search area,
    wherein the system is configured to determine location of the personal device whether or not the connection between the personal device and the Wi-Fi signal is completed.

2. The beacon detection system of claim 1 wherein the Wi-Fi signal receiver is a Wi-Fi radio.

3. The beacon detection system of claim 2 wherein the personal device completes a connection with the Wi-Fi signal and the Wi-Fi signal carries position information and data from the personal device to the beacon detection system.

4. The beacon detection system of claim 2 wherein SSID of the Wi-Fi radio is an SSID of a third party or a search subject's personal or business SSID.

5. The beacon detection system of claim 2 wherein the Wi-Fi detector is configured to determine a signal strength of the Wi-Fi signal and determine from the signal strength a possible direction for the search subject.

6. The beacon detection system of claim 1 wherein the system is as provided on an unmanned aerial vehicle.

7. The beacon detection system of claim 1 further including a processor, storage memory and code instructing the processor to detect the connection request from the data which is stored in the storage memory.

8. The beacon detection system of claim 1 wherein the Wi-Fi signal receiver, location position detector; and beacon detector are provided in a single housing.

9. A search system configured to operate on a search vehicle, comprising:
    a Wi-Fi radio capable of broadcasting one or more SSIDs preconfigured in a mobile device to connect to the SSIDs and receiving a connection attempt to connect to the one or more SSIDs, the Wi-Fi radio configured to broadcast the one or more SSIDs which are unique to a mobile device which is sought in a search and to allow Wi-Fi connections between the mobile device and the Wi-Fi radio;
    a location position detector configured to detect a position of the search vehicle; and
    a Wi-Fi detector responsive to the radio, the system configured to determine at least a location of the mobile device based on the connection attempt to connect to the one or more unique SSIDs, the location determined by a position of the search vehicle within a geographic search area traveled by the search vehicle in a search for a search subject at the time the connection attempt is made by the mobile device associated with the search subject and whether or not the connection between the mobile device and the WiFi radio.

10. The beacon detection system of claim 9 wherein the unique SSID is one of a plurality of SSIDs broadcast by the Wi-Fi radio of the search system.

11. The beacon detection system of claim 9 wherein the detector is configured to determine the signal strength of the Wi-Fi signal and determine from the signal strength a possible location for the search subject.

12. The beacon detection system of claim 9 wherein the system is contained in a housing provided on an unmanned aerial vehicle.

13. The beacon detection system of claim 1 further including a search identifier application provided on the mobile device, and the search identifier application configure to configure the mobile device to attempt to connect to the one or more unique SSIDs over a Wi-Fi radio in the mobile device.

14. The beacon detection system of claim 9 further including a search identifier application provided on the mobile device, and the search identifier application configure to configure the mobile device to attempt to connect to the one or more unique SSIDs over a Wi-Fi radio in the mobile device.

15. A computer implemented method of determining a location of a search subject, comprising:
- accessing search data including at least one or more connection attempts by a mobile device associated with a search subject to connect to broadcast Wi-Fi signals having one or more SSIDs uniquely associated with the mobile device of a search subject and pre-configured in the mobile device to connect to the SSIDs, the search data including geographic location coordinates of a search vehicle travelling in a geographic search area for the search subject, the search vehicle carrying a Wi-Fi radio capable of broadcasting the one or more SSIDs and receiving the connection attempts the one or more SSIDs;
- determining in the data a location associated with each of the at least one or more connection attempts from the mobile device by matching the geographic location coordinates of the search vehicle at the time of the at least one or more connection attempts, the determining the location occurs whether or not the connection between the mobile device and the Wi-Fi signal is completed; and
- outputting search information to a search agent, the search information including the location associated with each of the at least one or more the connection attempts to connect.

16. The computer implemented method of claim 15 wherein a search identifier application is provided on the mobile device, and the computer implemented method further includes:
- configuring the mobile device to attempt to connect to the one or more unique SSIDs over a Wi-Fi radio in the mobile device.

17. The computer implemented method of claim 15 further including receiving a registration of the mobile device from the search subject and storing data associating the mobile device and the search subject in a registry for use in the determining step.

* * * * *